Nov. 16, 1948. S. M. MARTIN 2,454,193
APPARATUS FOR MOLDING ARTICLES
Filed June 13, 1944 2 Sheets-Sheet 1
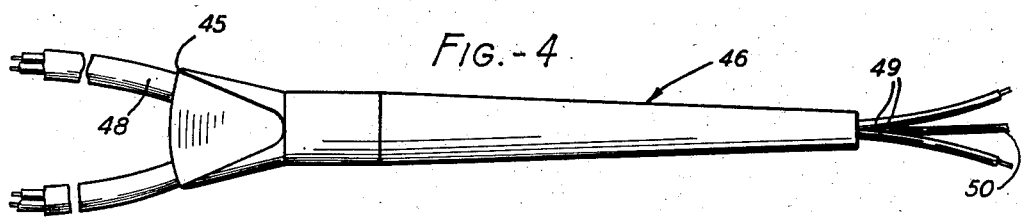
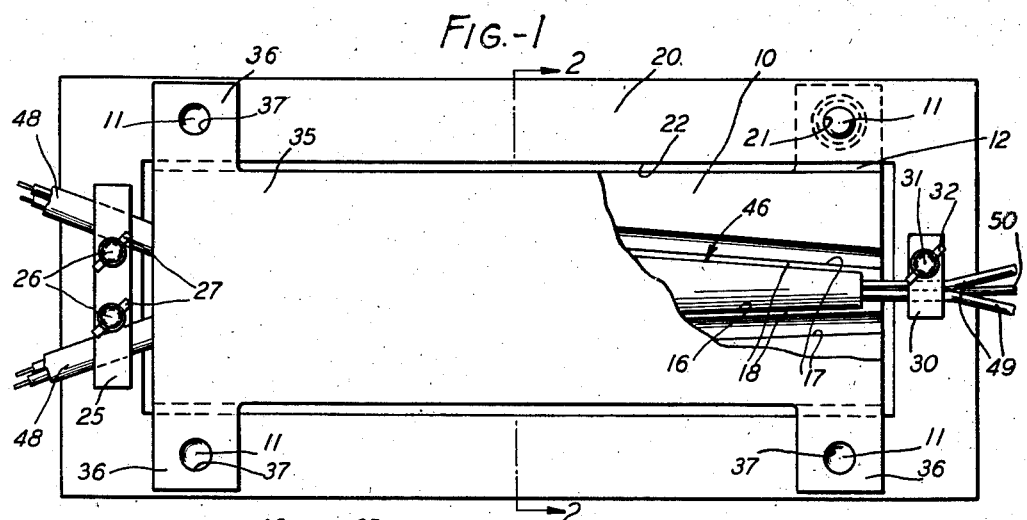
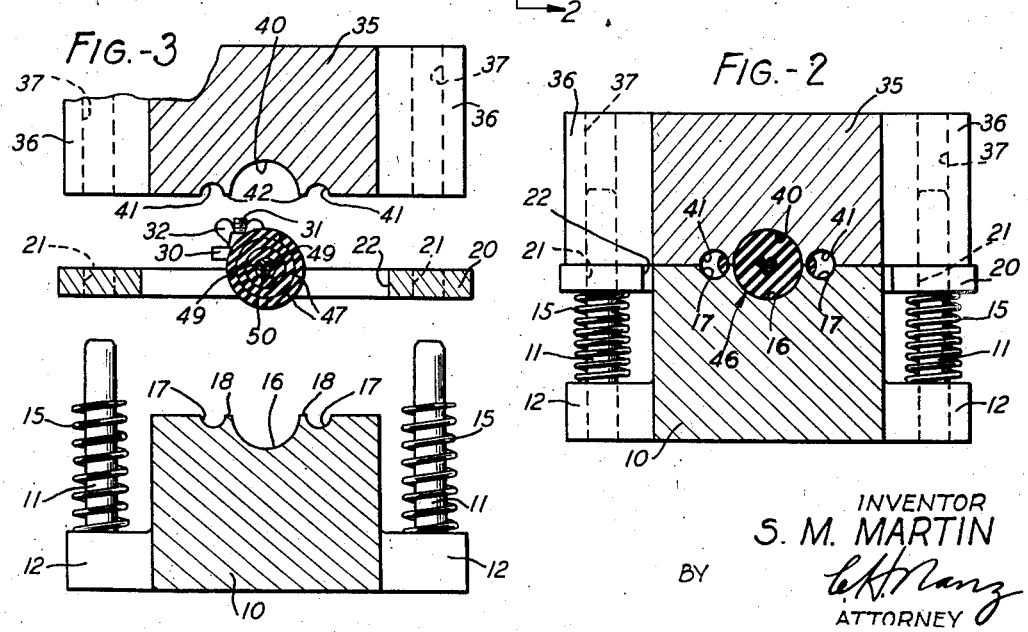
INVENTOR
S. M. MARTIN
BY
ATTORNEY Nov. 16, 1948.  S. M. MARTIN  2,454,193
APPARATUS FOR MOLDING ARTICLES
Filed June 13, 1944  2 Sheets-Sheet 2

INVENTOR
S. M. MARTIN
BY
ATTORNEY

Patented Nov. 16, 1948

2,454,193

UNITED STATES PATENT OFFICE 2,454,193

APPARATUS FOR MOLDING ARTICLES

Samuel M. Martin, Baltimore, Md., assignor to Western Electric Company, Incorporated, New York, N. Y., a corporation of New York Application June 13, 1944, Serial No. 540,083

5 Claims. (Cl. 18—36)

1

This invention relates to apparatus for molding articles, and more particularly to apparatus for molding bodies of insulating material on cords.

In the manufacture of some types of Y-type cords it is necessary to form a body of insulating material around the Y of such a cord. During such molding operations it is necessary to maintain the conductors of such a cord in a predetermined position in a molding cavity so that the conductors will remain in concentric alignment in the cavity during the molding operation.

An object of the invention is to provide new and improved apparatus for molding articles.

An apparatus embodying the invention comprises a mold having a molding cavity formed therein and means for holding a flexible element of an article to be molded under tension in said molding cavity.

A complete understanding of the invention may be obtained from the following detailed description of a specific embodiment thereof, when read in conjunction with the appended drawings, in which:

Fig. 1 is a top plan view of an apparatus embodying the invention with a portion thereof broken way;

Fig. 2 is a vertical, sectional view of the apparatus taken along line 2—2 of Fig. 1;

Fig. 3 is a vertical, sectional view of the apparatus, similar to Fig. 2 but with the elements of the apparatus in open position;

Fig. 4 is a plan view of an article molded by the apparatus embodying the invention;

Figure 7:
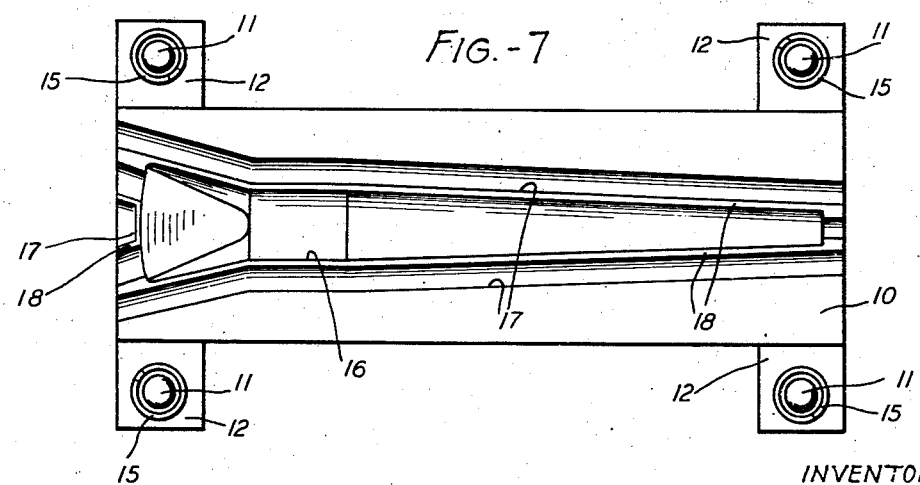
Fig. 7 is a top plan view of a bottom die member forming a portion of the apparatus.

Referring in more detail to the drawings, a bottom die member 10 (Fig. 3) has a plurality of guide pins 11—11 secured in lugs 12—12 projecting from the sides thereof and a plurality of compression springs 15—15 are mounted on the pins 11—11. The die member 10 has a molding recess 16 (Fig. 7) formed longitudinally thereof and a plurality of overflow passages 17—17 extending along the sides of the recess 16. The overflow passages 17—17 are separated from the recess 16 by thin ridges 18—18 formed therebetween.

Figure 6:
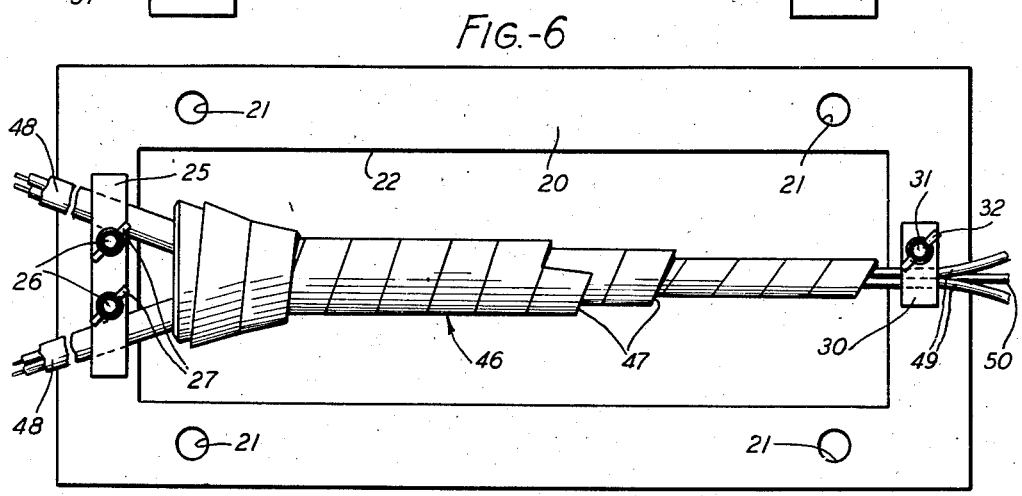
Fig. 6 is a top plan view of a frame forming a portion of the apparatus.

A frame 20 (Fig. 6) having a plurality of bores 21—21 formed therein is designed to be slidably mounted on the pins 11—11 with the pins projecting through the bores 21—21. A rectangular opening 22 formed in the frame 20 is slightly

2 larger than the body portion of the die member 10 and provides clearance between the body portion of the die member 10 and the frame 20 when the frame 20 is pushed downwardly against the action of the springs 15—15, as shown in Fig. 2.

A clamping plate 25 (Fig. 6) is mounted above one end of the frame 20 on a pair of bolts 26—26 projecting from the frame 20. A pair of wing nuts 27—27 serve to secure the clamping plate 25 on the bolts 26—26. A similar clamping plate 30 is secured by a wing nut 32 upon a bolt 31 projecting from the upper surface of the frame 20.

Figure 5:
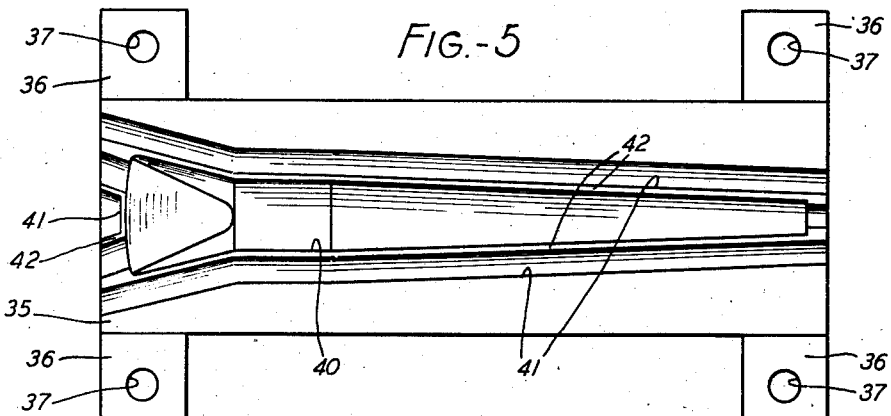
Fig. 5 is a bottom plan view of a top die member forming a portion of the apparatus.

An upper die member 35 (Fig. 5) is provided with a plurality of lugs 36—36 projecting therefrom. The lugs 36—36 have bores 37—37 formed therein which are so positioned that the guide pins 11—11 enter the bores 37—37 when the die member 35 is positioned over the bottom die member 10, as shown in Fig. 2. The lugs 36—36 are equal in height to the body portion of the die member 35 and, when the die member 35 is placed in the position shown in Fig. 2 of the drawings, serve to press the frame 20 below the upper surface of the body portion of the die member 10 against the action of the compression springs 15—15.

A molding recess 40 (Fig. 5) formed in the die member 35 cooperates with the molding recess 16, when the die members 10 and 35 are in the positions shown in Fig. 2, to form a molding cavity. A plurality of overflow passages 41—41 formed in the die member 35 are separated from the recess 40 by ridges 42—42. When the die members 10 and 35 are placed under pressure and assume the positions shown in Fig. 2, the ridges 18—18 and 42—42 are placed in abutting relationship and the passages 17—17 and 41—41 coact to form overflow passages.

In the operation of the apparatus described hereinabove to form a built-up body of insulating material such as a body 45 (Fig. 4) of a Y-type cord 46 from a plurality of rubber strips 47—47 (Fig. 6) the strips 47—47 are wrapped around the crotch of a Y formed by a pair of rubber jacketed, individually insulated, two-conductor cords 48—48 and a pair of individually insulated conductors 49—49 and a stay cord 50. Each of the conductors 49—49 forms a portion of one of the cords 48—48. The clamping plate 25 then is forced by the wing nuts 27—27 against the cords 48—48 of the cord 46 to secure the cords 48—48 against the frame 20 in positions shown in Fig. 6 of the drawings.

The ends of the conductors 49—49 and the stay cord 50 then are placed between the clamping plate 30 and the frame 20, are drawn taut, and the wing nut 32 is actuated to clamp the conductors 49—49 and the stay cord 50 against the frame 20. The clamping plate 30 (Fig. 6) serves to secure the conductors 49—49 and the stay cord 50 against the frame 20 with the wrapped portions of the conductors 49—49, the stay cord 50 and the cords 48—48 extending between the clamping plates 25 and 30 and under tension.

The frame 20 with the elements of the cord 46 secured thereto is then placed over the bottom die member 10 and is slid over the guide pins 11—11. When the frame 20 and the elements of the cord 46 held thereby are in this position, the elements of the cord 46 are positioned directly over the recess 16. The upper die member 35 is then slid over the guide pins 11—11 with the pins 11—11 extending into the bores 37—37 thereof. The assembled mold is then placed in a molding press (not shown) of a conventional type and the press serves to force the die members 10 and 35 together and the frame 20 over the upper portion of the die member 10, as shown in Fig. 2. When the plate 20 is pressed downwardly to the position shown in Fig. 2, the elements of the cord 46 are held concentrically with respect to the molding cavity formed by the recesses 16 and 40.

At this time portions of the conductors 49—49, the stay cord 50 and the cords 48—48 between the plates 25 and 30 are held in axial alignment with the molding cavity formed by the molding recesses 16 and 40, and since they are held under tension by the clamping plates 25 and 30, the pressure upon the rubber strips 47—47 cannot dislodge the conductors 49—49, the stay cord 50 and the cords 48—48 as the body 45 is formed concentrically on the other elements of the cord 46 from the strips 47—47. Any of the rubber composition embodied in the strips 47—47 which is in excess of the amount of that material required to form the body 45 will be forced into the overfflow passages 17—17 and 41—41.

The elements of the apparatus then are held in the positions shown in Fig. 2 of the drawings and are heated by the conventional heating means until the strips 47—47 are set in the form of the body 45, after which the die members 10 and 35 are withdrawn from the molding press and the die member 35 is moved away from the bottom die member 10 by the actions of the springs 15—15. As the die member 35 is slid upwardly on the pins 11—11, the compression springs 15—15 force the frame 20 upwardly, as viewed in Fig. 2, whereby the cord 46 is raised from the recess 16. The die member 35 then is removed completely from the pins 11—11 and the wing nuts 27—27 and 32 are loosened to release the cord 46 from the clamping plates 25 and 30. Another cord similar to the cord 46 then may be formed in a manner similar to the one just described.

As the frame 20 is pushed downwardly during a molding operation similar to that described above, the elements of the cord 46 secured to the frame are maintained under tension between the ends of the frame and are carried in a plane just above the frame 20. Thus, these elements of the cord 46 are prevented from sagging or being forced out of alignment with the molding cavity when the parts to be molded are subjected to pressure, whereby the cord 46 is perfectly formed.

A frame and elements associated therewith identical with the frame 20 and the elements associated therewtih may be used equally as well with a mold of the type which is designed to have molding material injected into the molding cavity thereof as the frame 20 is used with the die members 10 and 35. The operation of the last-described apparatus is identical with that described hereinabove except that the insulating material to be molded is injected into the closed mold rather than being in the form of the strips 49—49.

What is claimed is:

1. A molding apparatus, which comprises a pair of die members having complementary molding recesses formed therein and relatively movable from an open relationship to a molding relationship, means for aligning the die members, a rigid loading frame floatingly mounted with respect to the die members, said frame being removable from the die members, and clamping means mounted on the ends of the frame for securing a flexible core of a cord to the frame.

2. A molding apparatus, which comprises a stationary die member having a main body portion provided with a molding recess formed therein, a movable die member having a main body portion provided with a molding recess formed therein complementary to the first-mentioned recess, said second die member being movable from an open position into molding relationship with the stationary die member to form an article molding cavity therebetween and also being provided with lugs projecting from the main body portion thereof, a removable frame having an opening between the ends thereof for clearing the stationary die member, clamps carried on the ends of the frame for securing a flexible core of a cord to the frame in a taut condition, and means for urging the frame against the lugs of the movable die member when the molds are in a molding relationship.

3. A molding apparatus, which comprises a stationary die member having a molding recess formed therein, a plurality of guide pins, a movable die member having a molding recess formed therein complementary to said first-mentioned molding recess and being slidably mounted on the guide pins so that the second die member can be moved from an open position into molding relationship with respect to the stationary die member, a frame mounted slidably and removably on the guide pins, resilient means for urging the frame against the movable die member when the die members are in a molding relationship, and clamps positioned on the ends of the frame for securing a flexible core of a cord to the frame under tension, whereby the core is held in a predetermined relationship with respect to the molding recesses when the die members are positioned in molding relationship.

4. A molding apparatus, which comprises a lower, stationary die member having a molding recess formed in the upper face thereof, a plurality of guide pins, a loading frame slidably and removably mounted on the guide pins and having an opening therein which permits the frame to fit over said die member, a pair of clamps mounted on one end of the frame for securing two arms of a core of a Y-type cord to that end of the frame, a clamp mounted on the other end of the frame for clamping the stem of the core of the cord to that end of the frame, said clamps coacting to secure the portions of the core between the ends of the frame under tension, an upper die member having a molding recess formed in the lower face thereof complementary to said first-mentioned molding recess, said upper die member being slidably and removably mounted on the guide pins for pressing the guide frame over the stationary die member and being movable into molding relationship with said stationary die member, and a plurality of springs positioned over the guide pins for yieldingly supporting the frame.

5. A molding apparatus, which comprises a stationary die member having a Y-shaped molding recess formed therein, a plurality of guide pins projecting from the stationary die member, a loading frame slidably and removably mounted on the guide pins and having formed therein an opening for providing clearance for the portion of the stationary die member having the recess therein, a pair of clamping plates mounted on one end of the frame in spaced positions for clamping arms of a flexible core of a Y-type cord to that end of the frame, a clamping plate mounted on the other end of the frame for clamping the stem of the core to that end of the frame after the arms and the stem of the core have been tensioned, a movable die member having formed therein a Y-shaped molding recess complementary to the recess in the stationary die member and slidably and removably mounted on the guide pins for pressing the loading frame toward the stationary die member, and a plurality of compression springs mounted on the guide pins for pressing the loading frame against the movable die member when the die members are in a molding relationship.

SAMUEL M. MARTIN.

REFERENCES CITED

The following references are of record in the file of this patent:

UNITED STATES PATENTS

| Number | Name | Date |
|---|---|---|
| 215,231 | Manly | May 13, 1879 |
| 1,318,700 | Skolnick | Oct. 14, 1919 |
| 1,524,643 | Whitehouse | Jan. 27, 1925 |
| 1,868,177 | Rowe | July 19, 1932 |

FOREIGN PATENTS

| Number | Country | Date |
|---|---|---|
| 406,849 | Great Britain | Mar. 8, 1934 |